US009661035B2

(12) United States Patent
Alexander et al.

(10) Patent No.: US 9,661,035 B2
(45) Date of Patent: May 23, 2017

(54) METHOD AND APPARATUS FOR PROVIDING CALL FLOW INFORMATION TO TERMINAL DEVICES

(71) Applicant: VONAGE NETWORK LLC, Holmdel, NJ (US)

(72) Inventors: Jonathan Alexander, Roswell, GA (US); Keith Meyers, Powder Springs, GA (US)

(73) Assignee: Vonage Business Inc., Atlanta, GA (US)

( * ) Notice: Subject to any disclaimer, the term of this patent is extended or adjusted under 35 U.S.C. 154(b) by 51 days.

(21) Appl. No.: 14/664,122

(22) Filed: Mar. 20, 2015

(65) Prior Publication Data

US 2016/0277587 A1    Sep. 22, 2016

(51) Int. Cl.
*H04M 7/00* (2006.01)
*H04L 29/06* (2006.01)
(Continued)

(52) U.S. Cl.
CPC ...... *H04L 65/1069* (2013.01); *H04L 65/1006* (2013.01); *H04M 3/2218* (2013.01);
(Continued)

(58) Field of Classification Search
CPC .............. H04L 61/1547; H04L 65/403; H04L 65/1053; H04L 65/1069; H04L 65/1073;
(Continued)

(56) References Cited

U.S. PATENT DOCUMENTS 6,687,242 B1 * 2/2004 Enzmann ................ H04M 3/42
370/352
8,311,206 B1 * 11/2012 Fraser ............... H04M 3/42314
370/352

(Continued)

FOREIGN PATENT DOCUMENTS

EP          2608507 A1     6/2013

OTHER PUBLICATIONS

International Search Report and Written Opinion mailed Jun. 3, 2016 for Application No. PCT/US2016/023038, 11 pages.

*Primary Examiner* — Tri H Phan
(74) *Attorney, Agent, or Firm* — Moser Taboada; Joseph Pagnotta

(57) ABSTRACT

Methods and apparatus for providing call flow information to devices associated with call flow destinations are provided herein. In some embodiments, a method for providing call flow information to a terminal device comprises receiving a communication specifying an initial destination from a calling party, and at least one of assigning the received communication to a terminal device associated with the initial destination and an alternate destination, forwarding the received communication from a terminal device associated with the initial destination to a terminal device associated with the alternate destination, or re-assigning the received communication to a terminal device associated with the alternate destination rather than with the initial destination responsive to a call set up failure. A call flow indicator is generated and transmitted to the terminal device associated with the alternate destination, the call flow indicator including an identifier of the initial destination and an identifier of the alternate destination.

25 Claims, 10 Drawing Sheets

(51) Int. Cl.
*H04M 3/22* (2006.01)
*H04M 3/46* (2006.01)
*H04M 3/42* (2006.01)
*H04M 3/54* (2006.01)

(52) U.S. Cl.
CPC .......... *H04M 3/46* (2013.01); *H04M 3/42102* (2013.01); *H04M 3/54* (2013.01); *H04M 2203/551* (2013.01)

(58) Field of Classification Search
CPC .... H04L 29/06; H04L 65/1006; H04W 4/001; H04W 80/10; H04W 88/02; H04M 3/42; H04M 3/54; H04M 3/58; H04M 3/42025; H04M 3/42059; H04M 3/42178; H04M 3/42195; H04M 3/42263; H04M 2203/551; H04M 2207/203; H04M 3/22; H04M 3/46; H04M 3/2218; H04M 3/42102; H04M 7/00; H04M 7/0075
See application file for complete search history.

(56) References Cited

U.S. PATENT DOCUMENTS

| | | | | |
|---|---|---|---|---|
| 8,467,354 | B1* | 6/2013 | Jerkunica | H04L 65/1053 370/338 |
| 8,625,409 | B2* | 1/2014 | Kung | H04L 41/0604 370/217 |
| 8,989,363 | B2* | 3/2015 | Obata | H04M 3/42263 379/201.04 |
| 9,258,172 | B2* | 2/2016 | Oberle | H04M 3/42374 |
| 9,420,117 | B2* | 8/2016 | Majd | H04M 15/41 |
| 2014/0112333 | A1* | 4/2014 | Oberle | H04M 3/42374 370/352 |
| 2014/0269445 | A1* | 9/2014 | Majd | H04M 15/41 370/259 |
| 2015/0188727 | A1* | 7/2015 | Bruner | H04L 12/4633 370/329 |
| 2016/0234383 | A1* | 8/2016 | Oberle | H04M 3/42374 |

\* cited by examiner

| EXTERNAL ID | INTERNAL ID | GROUP / DEPT ID | TAG |
|---|---|---|---|
| NXX-813-4100 | 100 | SALES (EAST) - GENERAL | *SALES_E |
| NXX-813-4105 | 105 | SALES (EAST) - CAMPAIGN #1 | *SALES_E_AD1 |
| NXX-813-4110 | 110 | SALES (EAST) - CAMPAIGN #2 | *SALES_E_AD2 |
| NXX-813-4200 | 200 | SALES (CENTRAL) - GENERAL | *SALES_C |
| NXX-813-4300 | 300 | SALES (WEST) - GENERAL | *SALES_W |
| NXX-813-4400 | 400 | SUPPORT - BILLING | *SUPP_BILL |
| NXX-813-445X | 450-459 | SUPPORT - TECHNICAL (SMB) | *SUPP_SMB |
| NXX-813-446X | 460-469 | SUPPORT - TECHNICAL (UC) | *SUPP_UC |
| NXX-813-447X | 470-479 | SUPPORT - TECHNICAL (SVC) | *SUPP_SVCS |
| NXX-813-451X | 510-519 | PRODUCT WARRANTY (SMB) | *WARR_SMB |
| NXX-813-452X | 520-529 | PRODUCT WARRANTY (UC) | *WARR_UC |
| NXX-813-453X | 530-539 | PRODUCT WARRANTY (SVC) | *WARR_SVC |
| NXX-813-4000 | 000 | MAIN | *MAIN |
| NXX-813-46XX | 600-615 | LEGAL | *LEGAL |

FIG. 6A

| SESSION ID | SESSION INITIATOR ID | HOP # | DDI | TAG |
|---|---|---|---|---|
| 020115001 | 732-735-4896 | 0 | 451 | *SUPP_SMB |
| 020115001 | 732-735-4896 | 1 | 511 | *SUPP_SMB*WARR_SMB |
| 020115002 | 609-754-2017 | 0 | 105 | *SALES_E_AD1 |
| 020115003 | 410-864-1402 | 0 | 000 | *MAIN |
| 020115003 | 410-864-1402 | 1 | 523 | *MAIN_*WARR_UC |
| 020115003 | 410-864-1402 | 2 | 400 | *MAIN*WARR_UC*SUPP_BILL |
| 020115004 | 215-297-0858 | 0 | 000 | *MAIN |
| 020115004 | 215-297-0858 | 1 | 601 | *MAIN*LEGAL |

FIG. 6B

METHOD AND APPARATUS FOR PROVIDING CALL FLOW INFORMATION TO TERMINAL DEVICES

BACKGROUND OF THE INVENTION

Field of the Invention

Embodiments of the present invention generally relate to a method and apparatus for tracking call flows and/or for providing call flow information to devices associated with users having call handling responsibilities.

Description of the Related Art

Each employee of an enterprise is typically assigned a role having a specific set of duties around which groups of such employees are organized into departments. Examples of such departments may include sales, finance, shipping and receiving, customer service, technical support, accounting, and the like. In order to ensure that inquiries from customers, potential customers, and/or vendors are handled efficiently and effectively, it is not uncommon for a business to advertise more than one contact number as, for example, a main number, as well as numbers for one or more functions as identified above. Moreover, a business may set up special numbers just for use in tracking the effectiveness of advertising campaigns such, for example, as web-based advertising campaigns (e.g., Google AdWords and the like).

Whether or not an organization has anticipated (or planned) for a customer or potential customer to make contact via a particular phone number, winning and/or keeping a customer's business may depend on answering the call quickly and forwarding the call to the right employee(s) with as little delay as possible.

What is needed is a method and apparatus for providing users of terminal devices with call flow information by which the path taken by a calling party, such as a customer, can be readily visualized and/or distinguished.

SUMMARY OF THE INVENTION

Methods and apparatus for providing call flow information to a terminal device are provided herein. In some embodiments, a method for providing call flow information to a terminal device comprises receiving a communication from a calling party, generating a call flow indicator wherein the call flow indicator includes an identifier of an initial destination for the received communication and an identifier of the calling party, and transmitting, to a terminal device associated with the initial destination, a message including the generated call flow indicator.

In some embodiments, a method for providing call flow information to a terminal device, comprises receiving a communication from a calling party, the communication specifying an initial destination; at least one of assigning the received communication to a terminal device associated with the initial destination and with an alternate destination, forwarding the received communication from a terminal device associated with the initial destination to a terminal device associated with the alternate destination, or re-assigning the received communication to a terminal device associated with the alternate destination rather than with the initial destination responsive to a call set up failure; generating a call flow indicator, the call flow indicator including an identifier of the initial destination and an identifier of the alternate destination; and transmitting, to the terminal device associated with the alternate destination, a message including the generated call flow indicator.

In some embodiments, a method for providing call flow information to a user of a terminal device comprises receiving, at the terminal device, a message including a call flow indicator, wherein the call flow indicator includes an identification of a destination for a communication received from a call originator; and alerting a user to the identification of the destination, wherein the receiving terminal device is one of a plurality of terminal devices assigned to the destination.

In some embodiments, an apparatus for providing call identification to a user of a terminal device associated with one or more communication identifiers may include at least one processor, at least one input device, and at least one storage device storing processor-executable instructions which, when executed by the at least one processor, performs a method. In some embodiments, the method may include receiving a communication from a calling party, the communication specifying an initial destination; at least one of assigning the received communication to a terminal device associated with the initial destination and with an alternate destination, forwarding the received communication from a terminal device associated with the initial destination to a terminal device associated with the alternate destination, or re-assigning the received communication to a terminal device associated with the alternate destination rather than with the initial destination responsive to a call set up failure; generating a call flow indicator, the call flow indicator including an identifier of the initial destination and an identifier of the alternate destination; and transmitting, to the terminal device associated with the alternate destination, a message including the generated call flow indicator.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A is a tabular representation of stored associations between respective destination identifiers (e.g., external and/or internal destination addresses), one or more defined groups and/or departments, and respective tags used to generate call flow indicators in accordance with one or more embodiments of the present invention;

FIG. 6B is a tabular representation of communication session records, relating each communication session to a specific session identifier, session initiator (e.g., caller), internal destination identifier, and pre-defined tag, in accordance with one or more embodiments of the present invention;

Figure 1:
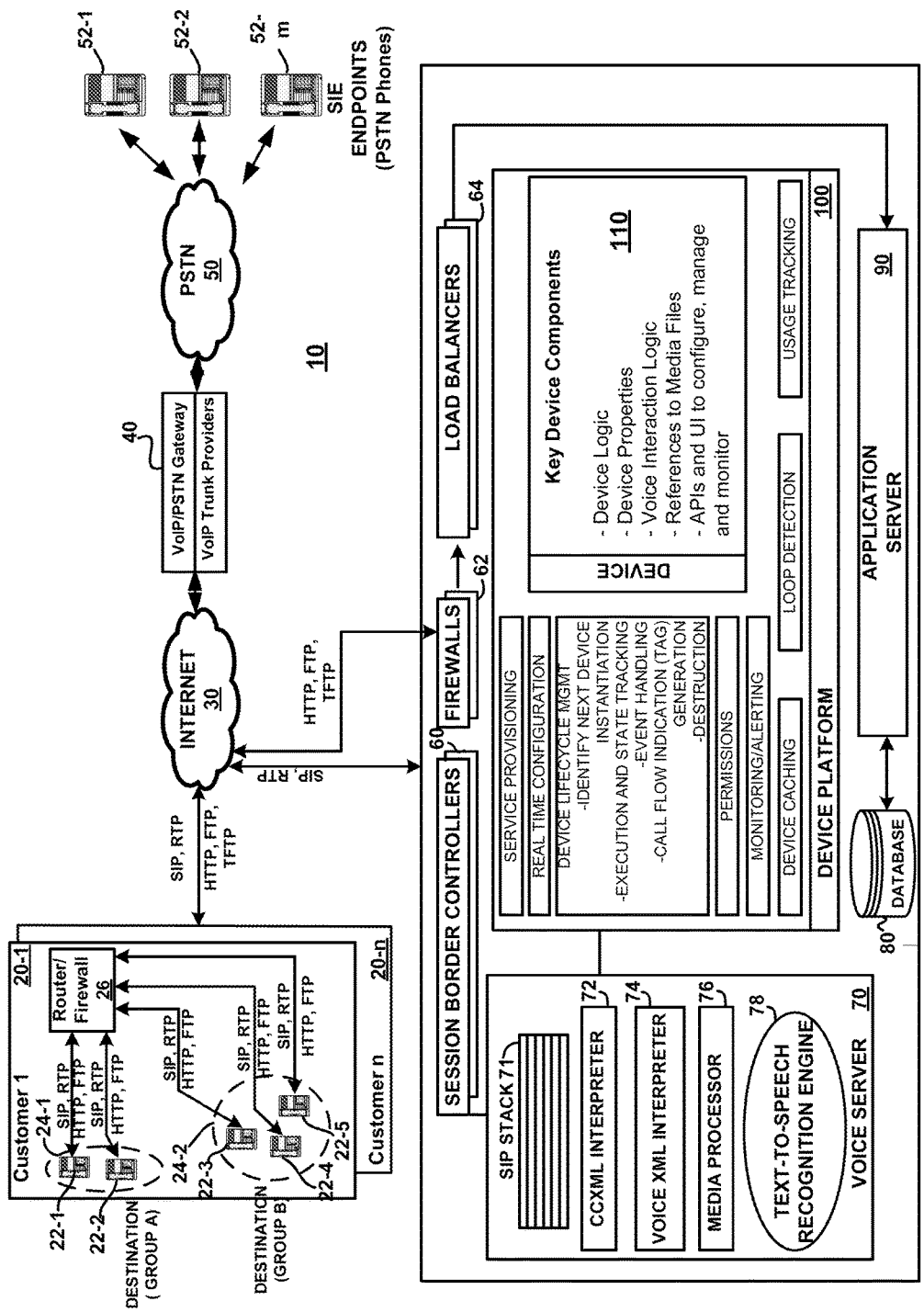
FIG. 1 is a block diagram of a communications environment including various elements which are associated with an Internet protocol (IP) telephony system operating in accordance with exemplary embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method for providing call flow information to a device associated with one or more destination identifiers. The associations may be static, as for example, between one or more employees and one or more destination addresses (e.g., telephone numbers, network addresses and the like) which are assigned to a particular business function, group, or department. The associations may also be dynamic, as for example, when respective destination addresses are assigned to corresponding advertising campaign of limited duration.

In embodiments consistent with the present disclosure, inbound calls or communication session invitations addressed to multiple destination addresses (i.e., "initial" destination addresses) are received and routed to the terminal device(s) of a user, or a group of users, that has been designated to receive such calls. In some cases, the session initiator (e.g., a caller), may speak with several users before concluding a single communication session. Call flow information provided to a terminal device according to one or more embodiments enables the use of the terminal device to visualize the path taken by the calling party, and to see the name of each department to which the calling party has been forwarded during a current communication session.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Prior to a detailed description of exemplary embodiments and aspects thereof, the following definitions are provided as an aid to understanding the subject matter and terminology of aspects of the present invention(s), are exemplary, and not necessarily limiting of the invention(s), which are expressed in the claims. Moreover, no definition set forth herein is intended to be read or understood in contravention of its plain and ordinary meaning. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

Account: a database entity that represents a single customer or provider.

Account service: a service that has been purchased by or on behalf of an account.

ASIC (Application Specific Integrated Circuit): an integrated circuit customized for a particular use. Early VoIP devices used ASICs and other hardware for digital signal processing, specifically constructed for processing voice.

Caching: a scheme whereby a copy of critical data that is accessed frequently is kept in a location that allows high-speed access to it, while maintaining synchronization between this copy of the data and the underlying slower source.

Call: A call is typically a phone call, usually handled by a number of devices.

Call group: a telephony feature whereby calling a number results in ringing several phones simultaneously thus increasing the chances that the call will be answered.

CCXML (Call Control eXtensible Markup Language): provides declarative markup to describe telephony call control. CCXML is a language that is based on XML and ECMA-script, and can be used with a voice user interface dialog specification language such as VoiceXML.

CCXML file: a collection of information and computer commands contained in a file in the known CCXML format.

CCXML Interpreter: a computer-implemented process or computer program that parses, operates upon, and executes the functions of a CCXML document.

CCXML properties document: a CCXML document that provides information (variable values and other information) for creating a specific instance of an associated component (e.g. a device, a kit) that is represented by CCXML Child device (e.g., a "transferee"): The device following the current device in the chain of processing a call.

Cloud: a system environment to which access is provided over the internet that allows developers to deploy their applications to this environment without concern for the routine management, upkeep, uptime and capacity planning and growth of the infrastructure.

Computer executable document: Self-contained file or other unit that can be processed by a computer to extract its components and operations, and can include logic, scripts, pointers to other information, configuration parameters, variables, etc. The logic and resources are common to a particular telephony function.

Configurable software-implemented telephony device, also device: A device is specified by a CCXML document and a set of properties. It contains logic, properties, and resources, and performs a telephony function through software.

Connection: a specific instance of a "lifetime" of a communication between two particular identified communicating elements, for example, a call between two telephones, a single call into a conference call that includes multiple telephones, the time during which a "message recorder" component is storing signals represented a saved voice message, etc. A connection almost invariably has a lifetime shorter than that of a communication session, as a session is required to "hold together" the various resources (e.g. devices, memory allocations, etc.) required to make a connection. A connection is necessarily associated with a session, but a connection can be transferred or handed off to a different session.

Customer: a consumer of the services provided by the disclosed embodiments. The consumer may be a multi-user business made up of many individual end-users or a single-user entity. Each customer is represented by an Account in the database.

Database: a repository of information which provides means to retrieve, find, update, delete, backup and copy such information using standard languages, such as Structured Query Language or SQL.

Device CCXML logic document: a CCXML document that provides the core functionality (computer program instructions in the CCXML format) of a particular component in the disclosed embodiments, such as a device or a kit. A device CCXML logic document does not contain specific parameters for an instance of a device or a kit. A specific instance of a device or a kit is created (instantiated) when the data of a particular CCXML properties document—typically but not necessarily associated with a particular account or a particular customer or a particular service provider—is processed by a CCXML interpreter and "combined" with the functionality of the device CCXML logic document, becomes a particular instance of the device.

Device: See configurable software-implemented telephony device. An instance of a Device Type on behalf of an Account. Identified by Device-GUID.

Device type: A definition or template for the device. Devices are instances of device types. Identified by Device_Type_ID.

GUID (Globally Unique Identifier): an identifier that is designed to be universally unique, used to identify a specific object instance in the system (in the case of the disclosed embodiment, the device).

HDAP (Hosted Device Applications Platform): A component based environment that promotes rapid reuse for VoiceXML and CCXML compliant applications that have been built using the framework.

HDAP server: a server on which a copy each of the voice server and the application server are deployed and executing.

Load balancing: a technique to spread work between two or more computers, network links, CPUs, hard drives, or other resources, in order to get optimal resource utilization, throughput, or response time.

Media file: A resource managed by HDAP that is used in the execution of a device. A media file is typically an audio file, but may also be an image file or a video file.

Memcache: a general-purpose distributed memory caching system, that is often used to speed up dynamic database-driven websites by caching data and objects in memory to reduce the number of times the database must be read. A giant hash table is distributed across multiple machines, and when full, subsequent inserts cause older data to be purged in least recently used order.

Parent device (e.g. a "transferor"): The device immediately prior to the current device in the chain of processing a call.

PBX (Private Branch Exchange): A telephone exchange that serves a particular location, business, or office, as opposed to one operated by a common carrier or telephone company for many locations (general public). PBXs connect internal telephones of a private organization and also connect them to the PSTN.

Provider: An organization that sells VoIP services to its customers and uses the system described by the disclosed embodiments to provide those services. A single instance of the system described by the disclosed embodiments can include many providers. Each provider has an account of their own, under which are the accounts of its customers. The database can hold a hierarchy of providers. Providers may be White Labelers (ones who hide the name of original operator of the system, and brand the product under their own name) and Resellers (who sell the product under the name of the original operator of the system.

Provisioning Server: A server from which an IP phone can remotely download the configuration that it needs to connect to a VoIP system and make and receive calls.

PSTN (Public Switched Telephone Network): The PSTN is the network for the world's public circuit-switched telephone networks. These systems predate VoIP systems.

RTP (Real-time Transport Protocol): A standardized packet format for delivering audio and video over the Internet.

Root CCXML document: a CCXML document that provides the core functionality (computer program instructions in the CCXML format) of a particular component in the disclosed embodiments, such as a device or a kit. A root CCXML document does not contain specific parameters for an instance of a device or a kit. A specific instance of a device or a kit is created (instantiated) when the data of a particular CCXML properties document—typically but not necessarily associated with a particular account or a particular customer or a particular service provider—is processed by a CCXML interpreter and "combined" with the functionality of the root CCXML document, to become a particular instance of the device.

Service: A product feature or set of features provided by devices, that can be purchased, provisioned and consumed. Services are purchased by customers, and customers are billed for the Services that they have purchased. Identified in the database by Service-Id.

Service provider: see Provider.

Session for "Communication Session"): a specific instance of a "lifetime" of particular components of the system, identified during processing by a session identifier. The variable sessionid is used in the disclosed embodiments to represent and reflect a session. Once a session is ended, by natural expiration or termination, the resources associated with that session are released by the system's operating system or controller. A session can "live" before and after any associated active connections, or no connections at all. Termination of a session necessarily ends any associated connections.

Session border controller: a device used in VoIP networks to exert control over the signaling and usually also the media streams involved in setting up, conducting and tearing down calls. SBCs are inserted into the signaling and/or media paths between the calling party and the called party in a VoIP call.

SIP (Session Initiation Protocol): a signaling protocol, widely used for setting up and tearing down multimedia communication sessions such as voice and video calls over the Internet. Other uses include video conferencing, streaming multimedia distribution and instant messaging.

Telephone: a telecommunications device that is used to transmit and receive sound (voice).

Telephony: the use of equipment to provide voice communication over distances, specifically via connecting telephones together.

UDP (User Datagram Protocol): sometimes called the Universal Datagram Protocol, is one of the core protocols of the Internet Protocol Suite, allowing programs on networked computers to send short messages or datagrams to one another. UDP does not guarantee reliability or ordering, and datagrams may arrive out of order, appear duplicated, or go missing without notice. Any reliability checks of the transmitted information are performed in upper layers. Common network application that use UDP include, the Domain Name System (DNS) and streaming media applications such as IPTV, VoIP, TFTP and online games.

URI (Uniform Resource Identifier): a compact string of characters used to identify or name a resource on the Internet or on an IP network.

Voice Server: A server that includes a SIP stack, CCXML interpreter, a VoiceXML interpreter, media handling capabilities, ability to interface with text to speech and speech recognition systems.

VoIP (Voice over Internet Protocol): a protocol optimized for transmission of voice through the Internet or other packet-switched networks. VoIP is often used abstractly to refer to the actual transmission of voice rather than the protocol that implements the voice transmission.

A hosted voice application for providing telephony functionality can be viewed as a group of devices connected to serve the same purpose as the hosted application. A call is passed from one device to another. Each device individually has enough intelligence to evaluate the call, provide the telephony functionality that is expected of it for the particular nature of the call, and determine the next device destination for the call. This approach also allows end-users to select these devices and place them together in various other ways as desired.

Turning attention to the drawings, FIG. 1 is a diagram of a VoIP system 10 that illustrates the use of configurable software-implemented telephony devices 110 within a hosted device applications platform (HDAP), a device platform 100, to provide telephony functionality. The VoIP system 10 provides telephony functionality from the device platform 100 between customers 20-1 to 20-$n$ connected to the Internet 30 and PSTN phones 52-1 to 52-$m$ (which are alternatively referred to herein as "session initiating endpoints" when used by patrons of a customer) connected to a public switched telephone network (PSTN) 50. The PSTN 50 is connected to the Internet 30 through VoIP/PSTN gateway and/or VoIP trunk providers 40.

The device platform 100 enables rapid reuse for VoiceXML and CCXML compliant applications that have been built using its framework. Each discrete functionality is serviced by a telephony device 110 that is dedicated to that particular type functionality. The device platform 100 connects this group of components together into a specific application. For example, one telephony device 110 could handle recording, another handles switching based on an input for routing a call in a particular fashion, another receives audio, and another sends audio, Of course, much more complicated telephony devices 110 could be used also. Any desired phone functionality can be implemented by some particular collection of these telephony devices 110.

Customers 20-1 to 20-$n$ use the Internet 30 to connect to outside telephone systems. At their premises, they typically have IP phones connected to a Local Area Network (LAN) that is connected to the Internet 30 through some combination of routers and firewalls. The IP phones use the Session Initiation Protocol (SIP) for signaling and use the Real-time Transport Protocol (RTP) for audio. IP phones can automatically provision (or configure) themselves by fetching provisioning files through the Internet 30, Various types of IP phones use protocols ranging from FTP (File Transfer Protocol) and TFTP (Trivial File Transfer Protocol) to HTTP (Hypertext Transfer Protocol).

Telephony devices 110 within the device platform 100 may also access subscriber PSTN phones 52-1 to 52-$m$ that are connected to the PSTN 50. When a PSTN phone 52 desires to talk to someone on a customers IP phone, the PSTN provider routes the call to the CLEC (Competitive Local Exchange Carrier) that owns the customer phone number, and in turn the call is routed to a VoIP/PSTN gateway and/or VoIP trunk provider 40.

The PSTN accesses the Internet 30 through VoIP/PSTN gateway and/or VoIP trunk providers 40 that provide either PSTN/VoIP gateway services, SIP trunks or both. Larger providers sometimes have both services. It is not unusual for a VoIP/PSTN gateway provider to also be a CLEC. For purposes of the inventions described herein, it is sufficient that calls from PSTN phones 52 are converted to VoIP external to the device platform 100, and that calls that are received into the device platform 100 arrive as VoIP calls. Similarly, outgoing calls from the device platform 100 use VoIP.

SIP and RTP traffic goes through the Session Border Controllers (SBC) 60. The SBCs 60 perform registration, authentication, routing, NAT (network address translation) traversal, media anchoring, load balancing and prevention of denial of service attacks. Registration keeps track of the IP address and SIP port for each customer phone. Authentication ensures that only authorized phones can send calls from the device platform 100, Routing ensures that calls are sent to the correct providers based on the information (from/to) in the SIP header. NAT traversal handles issues stemming from network address translation at the on-premise router/firewall. Media anchoring provides that for certain types of calls, the audio is anchored at the SBC rather than forwarded to the voice servers 70, thus allowing the calls to pass directly to the other party via the SBC. Load balancing ensures that calls are balanced relatively equally across the available voice servers 70. Prevention of denial of service attacks provides protection against malicious calls or hack attempts through calls, which can overwhelm and/or bring down the system.

Firewalls 62 receive the non-call traffic such as, for example, HTTP from browsers that are being used to configure the phone system, and FTP, TFTP or HTTP from phones retrieving their provisioning files. The firewalls 62 send the HTTP web traffic to the load balancers 64, and send other traffic to the respective destinations.

As noted above, the load balancers 64 receive HTTP web traffic and balance the load across a bank of web application servers 90. The voice server 70, also referred to as a voice application server, includes functionality provided by different components (which may also be independent modules) including a SIP stack 71, a CCXML interpreter 72, a VoiceXML interpreter 73, a media processor 74 and a Text to Speech/Automatic Speech Recognition (TTS/ASR) engine 75. The voice server 70 executes the aspects of the device platform 100 that are directly telephony-related. The SIP stack 71 receives, processes, generates, and sends SIP messages compliant with the W3C SIP standard. To facilitate call control, events are sent to the CCXML interpreter 72.

The CCXML interpreter 72 interprets CCXML documents. CCXML is a W3C draft standard for an XML and ECMAScript based language for exercising call control. CCXML absolves the programmer from dealing with direct protocol level programming and provides a flexible and rapid mechanism for call control, i.e. establishing, joining, un-joining, conferencing, holding, un-holding, transferring, tearing down calls, etc. The CCXML interpreter 72 sends events to the SIP stack 71 based on the directives in the CCXML documents. The CCXML interpreter also maintains and tracks sessions, connections and channels and provides the abstraction layer between CCXML and the communications protocol, in this case SIP.

The VoiceXML interpreter 74 interprets VoiceXML documents and works closely with the CCXML interpreter 72. VoiceXML is another W3C standard for an XML and ECMAScript based language and is used for creating dialogs that control voice user interfaces. VoiceXML dialogs can be used to program complex interactions between an automated phone system and a user by using DTMF digits, speech recognition and text to speech synthesis. VoiceXML enables the developer to program these interactions without the need for the programmer to understand and master the underlying telephone and communications protocols.

The voice server 70 uses the media processor 76 to handle media (RTP audio), The media processor 76 is able to receive and transmit media, as well as mix audio for conferences. The media processor 76 is also capable of handling multiple codecs and converting from one codec to another. The TTS/ASR engine 78 uses text-to-speech (TTS) synthesis to create automated prompts and greetings, and uses advanced speech recognition (ASR) to recognize speech for user input in the place of DTMF digits. The TTS/ASR engine 78 uses industry standard protocols for processing text-to-speech synthesis and speech recognition. Requests to the TTS/ASR engine 78 originate in VoiceXML documents that are interpreted in the VoiceXML Interpreter 74.

A database 80 holds customer data, device definition data, device configuration data, call usage log data, state information for certain complex types of calls (conferencing, call queues), user permissions data, billing data, and many other configuration parameters that drive and control the behavior of the system. Also stored within database 80 are call flow indication tags which have been assigned to respective users, user devices, and/or groups of user devices. The assignments are made by reference to destination address identifiers which, in exemplary embodiments, include the dialed number as extracted from PSTN dialed number information services (DNIS) data. In embodiments, the tags are alphanumeric indicia corresponding to a particular function or classification. These are generally selected such that a terminal device user viewing a flow indicator incorporating one or more tags is able to readily ascertain the interest of the caller, as well as the path the caller has taken prior to assignment of the call. The primary interface into the database 80 is from the application server 90.

The application server 90 is actually a bank of servers that perform several functions including: (1) execution of those aspects of the device platform 100 that are not directly telephony-related, (2) serving the CCXML and VoiceXML documents requested by the CCXML interpreter 72 and VoiceXML interpreter 74, (3) dynamically generating CCXML and VoiceXML documents in response to certain requests, (4) managing access to the database 80 and converting data as appropriate into object-oriented objects or CCXML properties documents as appropriate and (5) serving the web user interface application through which customer users and administrators can configure and manage the phone services offered by the telephony devices 110 in the device platform 100.

The device platform 100 is the engine that enables and supports the telephony device 110 technology by providing the services necessary for telephony devices 110 to exist and execute. The key functions provided for by the device platform include service provisioning, real-time configuration, device lifecycle management, permissions, monitoring/alerting, device caching, loop detection and usage tracking. It should be noted that some functionality of the device platform 100 is executed within the voice server 70, whereas other functionality is executed in the application server 90, and some functionality is executed in both servers.

The service provisioning function of the device platform 100 is performed in the application server 90 and involves the creation of the correct number and type of telephony devices 110 when a customer purchases a new service. Further, the telephony devices 110 need to be initialized with the correct properties and hooked together in the correct manner by default, so that the service is plug-and-play, therefore being useful and usable immediately following the purchase-time provisioning.

The real-time configuration function of the device platform 100 is performed at the application server 90 and refers to the ability provided by the device platform 100 for device properties to be configured "on the fly", a key benefit of the software telephony device architecture. Users and administrators, or developers, can make changes to the configuration through a user interface or Application Programming Interface (API), and these changes take effect immediately, so that on the very next call any changed telephony devices 110 follow the new configuration.

The device lifecycle management function of the device platform 100 refers to the core of device execution. The device platform 100 has the capability to perform:

a) Identification of the next device. This is performed at both the application server 90 and the voice server 70. The next telephony device 110 to be invoked is determined according to the directive of the current telephony device 110, or alternately by a "getroute" API call in response to which the device platform 100 can compute the next telephony device 110 that should get the call.
  b) Invocation and instantiation of the next telephony device 110. This is done at both the application server 90 and the voice server 70, and is a multi-step process that involves generating and/or fetching and interpreting the properties CCXML document of the next telephony device 110, establishing the necessary CCXML sessions and handing off the connection with the correct directives and data to the next telephony device 110.

c) Device execution, which is done at the voice server 70. This includes interpretation of the CCXML and VoiceXML documents, processing of the SIP and RTP in accordance with the directive in the device documents, handling errors, logging progress and usage, and exposing monitoring information.

d) State tracking. This is performed at both the application server 90 and the voice server 70. For some telephony devices 110, such as call queue devices and conference devices, the application server and voice server need to exchange state data, and persist it for the length of the call to facilitate both telephony and real-time tracking and reporting requirements.

e) Event handling. This is done at both the application server 90 and the voice server 70 and includes handling of events raised by the SIP stack 71, sending events to the SIP stack 71, sending events to the application server 90, and the application server 90 handling those events with specific API methods and returning appropriate data or documents back to the voice server 70.

f) Call Flow Indication (Generation and Tracking). This is done at the application server 90 and database 80. During provisioning of call flow tracking services, an administrator assigns a unique tag to each of a plurality of destination addresses processed by system 10. A telephone number associated with a particular online advertising campaign is an example of a destination address which a caller might dial after seeing an online ad. Likewise, specific published or disseminated telephone numbers may be destination addresses associated with a respective business function or department within an enterprise and, during provisioning, each of these numbers may be assigned to particular group of one or more terminal devices used by employees responsible for the applicable function. Stored in association with each destination address is at least one tag for use in tracking and constructing call flow indication messages in accordance with one or more embodiments.

g) Destruction. This is performed at both the application server 90 and the voice server 70 and includes termination of device execution, cleanup and post-logging.

The permissions function of the device platform 100 is handled at the application server 90 and includes enforcement of rules on which users can configure and use each telephony device 110. The monitoring and alerting function of the device platform 100 is handled at the voice server 70 and the application server 90. The device platform 100 tracks the progress of telephony devices 110 and exposes that information from the voice server 70. The application server 90 pulls this information and can display it, and provide alerts accordingly.

The device caching function of the device platform 100 is performed at the voice server 70 and the application server 90. Device logic CCXML documents are parsed, cached and reused. Device properties CCXML documents are generated once, and then used repetitively from cache. Other critical information including device routes and relationships between phone numbers, SIP ID and telephony devices 110 is stored in fast caches. These caches then have to be kept in sync with the master copy of data, usually in the database 80, and this is done by the device platform 100.

The loop detection function of device platform 100 is performed by the voice server 70. Bad device configurations can sometimes lead to traffic loops. Although powerful switches with gigabit-capable backplanes can handle some (STP) loops without compromising the performance of a management CPU, looped packets can cause input buffers to overflow on network interface cards and in receive/transmit (Rx/Tx) buffers on the switches, causing slow performance when connecting to other devices. The device platform 100 detects such conditions, has configurable thresholds for different kinds of loops, and kills the loop when the thresholds are exceeded. The condition is reported via an automated email to the system administrator. The usage tracking function of the device platform 100 is performed by the voice server 70 and the application server 90. The device platform 100 (at the CCXML level) emits critical log information, that is sent to the application server 90, which collates and processes these logs according to complex logic rules to track and bill usage.

The device platform 100 provides an environment where a software-implemented configurable telephony device 110 performs a particular function over and over, regardless of the context, and thus where different telephony devices 110 can be configured in multiple ways and used together or separately for any conceivable telephony functionality. Based on this paradigm, the basic reusable building block component of any voice application running on the device platform 100 is a (software) device. A simple telephony device 110 performs an atomic function that is essentially the same regardless of the context in which it is invoked. An example of a simple telephony device 110 might be a voicemail device that (in its default configuration) plays a greeting, records the message and notifies the voicemail owner that messages are wafting. Runtime property values can be used to influence specific actions of a device instance. So, for example, each person using the voicemail device may play a different greeting. Other examples of basic devices are a SIP handset device, a PSTN device, a switch device, etc. Examples of more complex devices are a PBX and an auto attendant. Telephony devices 110 are hooked up together much like they would be if they were physical devices that make up an office phone network. A diagram showing the logical connection between telephony devices 110 is a configuration graph.

According to aspects of the described inventions, certain functions are implemented in a hosted environment using CCXML, the Call Control eXtensible Markup Language. CCXML provides declarative markup to describe telephony call control and is a language that can be used with a dialog system such as VoiceXML. Details of CCXML and its implementation are provided by W3C® (World Wide Web Consortium)(http://www.w3c.org), and can be found at http://www.w3.org/TR/ccxml/, the contents of which are incorporated herein by reference and made a part hereof.

As will be known to those skilled in the art, CCXML can be employed to provide a complete telephony service application, comprised of Web server CGI compliant application logic, one or more CCXML documents to declare and perform call control actions, and to control one or more dialog applications that perform user media interactions. CCXML, as expressed in CCXML documents that are executed by a CCXML interpreter, is utilized in the disclosed embodiments and aspects to store, locate, and implement root device types, devices, kits types, kits, and instances of such root device Also as will be known to those skilled in the art, CCXML documents contain scripts for executing specific computational and control functions (namely, via the known ECMAScript), variable definitions, specific values for variables in accordance with the definitions, handles events that occur during the operations of the function. The main aspects of a CCXML implementation include: (a) event processing, (b) scripting (logic and control), (c) maintenance of a life cycle of a session or connection, (d) definitions of variables, expressions, and other data required to provide the function, and (e) if provided, signal processing functions such as conferencing, bridging, filtering, setting up and breaking down connections, etc.

Figure 2:
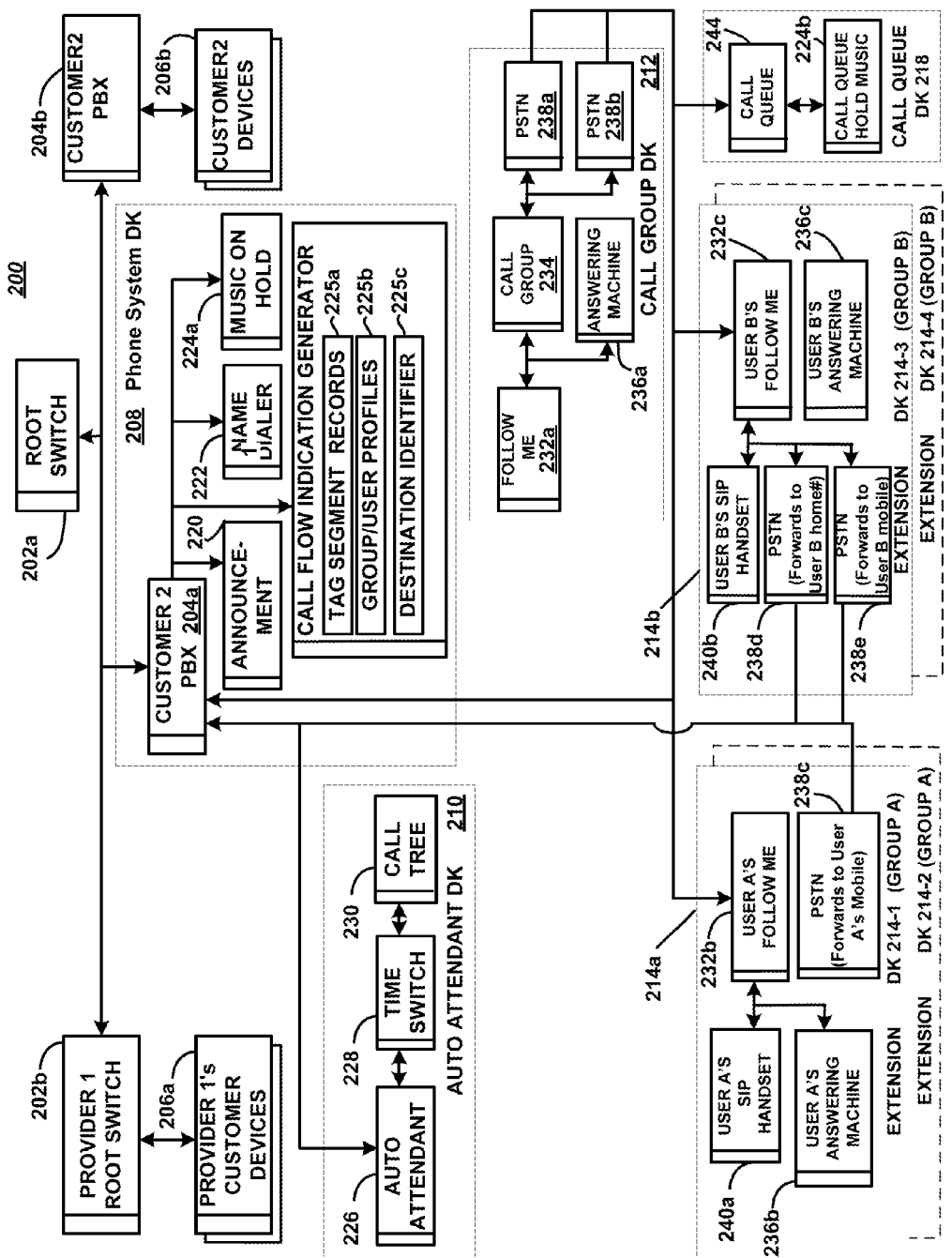
FIG. 2 is an exemplary configuration graph illustrating how logical connections between telephony devices as in FIG. 1 are used to achieve call flow tracking, alerting, and advanced telephony functionality according to one or more embodiments of the present invention.

FIG. 2 is an exemplary configuration graph 200 illustrating the logical connection between the telephony devices in the exemplary embodiment for providing call flow indications depicted in FIG. 1. It should be noted that each small box (with two vertical lines on the left) is a software telephony device 110. The dotted box that surrounds a group of devices represents a device kit, which is a group of devices that are often used together for a common complex function. The purpose of configuration graph 200 is to show, through a sample configuration, how the functionality of a telephony system can be divided and conquered through the use of devices. Lines running from one device to another represent device connections. The existence of a device connection between two devices implies that under some circumstance a call can be passed from one device to the other. It does not mean that every call will pass through that connection. Whether a call traverses a device connection in the graph or not depends on the logic of the device, parameters of the call and the properties of the parent device. The arrow head on the connection line indicates which direction the call can be passed in. In some cases, devices may be connected together with bi-directional connections, which mean that either device can pass a call to the other. It is important to note that unlike in a hardware telephony system, or even a less flexible software telephony system, connections are not hardwired and unchanging. In the disclosed embodiments herein a device connection is nothing more than a property, of type device connection. In other words, a connection is a configuration parameter of the source device and the value of the parameter is the Device GUID of the target device. It can be very easily changed, as easily as changing data in a database, to point the connection to a different device or remove it altogether. Thus, once the devices have been created and configured, it is very easy and quick to change the configuration graph and create new routes and functionalities, and therein lies the power of the device architecture.

The configuration graph 200 has the appearance of a hierarchy or an inverted tree. At the root of the tree is the root switch 202a. The root switch 202a is responsible for making calls to destinations outside the system, as well as routing inbound calls to the right next device. The root switch is directly connected to one of two kinds of devices—either provider root switches such as root switch 202 b, or PBX devices of direct customers such as customers on whose behalf PBX 204a is operated. As used herein, a "direct" customer is a customer such as a commercial enterprise on whose behalf a PBX is operated as a hosted solution. In other embodiments, the enterprise may operate its own stand-alone PBX to generate and provide call flow indications to users of supported communication terminals.

In any event, and with continued reference to FIG. 2, it will be seen that PBX device 204a is usually the entry point into the phone system device kit 208, and is usually accompanied by an announcement device 220 (that can play recordings), a name dialer 222 that can list the names of all the users within the PBX and allow them to be reached by extension number of phone menu option, and a music on hold device 224a that plays the chosen audio file that the customer has chosen for their hold music for their company's phone system.

Calls into customer 1 go through the customer 1 PBX device 204a, and likewise all calls into customer 2 go through the customer 2 PBX device 204b. The focus of configuration graph 200 is customer 1, so the only third level of devices shown are the ones for customer 1, but it should be noted that provider 1 root switch 202b and customer 2 PBX 204b will normally have a number of similar devices underneath them in the tree as well.

A PBX device is usually connected directly to other devices that have an extension number. Accordingly, customer 1 PBX 204a is shown to be connected to an auto attendant device kit 210, to a call group device kit 212, to an extension device kit 214b, a call queue device kit 218, and to another extension device kit 214b. When a call comes into the PBX device 204a from the root switch 202a, the PBX 204a looks first to see if the dialed digits match any of the extension numbers known to it. If so, the PBX 204a routes the call to the device to which that extension number points.

If there is no match, then the PBX device 204a makes a getroute call to the application server, passing the dialed digits. The application server returns a route to the number in the form of a list of devices to traverse. The PBX 204a hands the call off to the first device in the list. In some cases, a call may be handed off to an auto attendant device. Auto attendant kit 210 is made of an auto attendant device 226, a time switch device 228 and a call tree device 230.

Auto attendant 226 answers a call, plays a phone menu, takes user input and routes the call based on the input. Time switch device 228 determines that for a current time slot, the call needs to be sent to a specific call tree device 230. An example would be if a customer has one phone menu for business hours, a second phone menu for non-business hours, and a third phone menu for holiday periods. Time switch device 228 routes calls to different devices according to time considerations.

A call tree device 230 that services an applicable time period receives a call and plays a phone menu message to the caller. An example phone menu message might be: "Thank you for calling Acme Computers. For sales press 1, for support press 2, . . . " In actuality, the call tree device 230 uses announcement device 220 to play the message. After playing a phone menu message, the call tree device 230 waits for a response input from the caller. After receiving the caller response input (i.e., caller presses key one on their phone for sales), the call tree device's properties indicate that for this response, the call goes to a particular extension. (The extension in this example applies to the sales call group, however, the call tree does not and need not know this particular information.) The call tree device 230 is configured to send the call back to the PBX device 204a, with the particular extension number corresponding to option one from the phone menu's properties.

The call group device kit 212 has a follow me device 232a at its entry point. The follow me device 232a first sends the call to the call group device 234 next to it, and if there is no answer then moves on to the answering machine device 236a. The call group device 234 in turn is connected to two PSTN devices 238a, 238b that it calls simultaneously. One of the PSTN devices 238a is connected to extension device kit 214a and the other to extension device kit 214b. In this case, these are the two extensions that may be rung if a call reaches the call group 234. In practice, however, many more such extension PSTN devices and device kits may be provisioned and available for user (depending upon, for example, the size and scope of Customer 1'S operation and the number of extensions assigned to its employees and/or agents).

As used herein, an extension is intended to refer to each internally assigned number or line appearance associated with a particular user. In the embodiment of FIG. 2, a first group (Group A) of Customer 1 users is supported by extension device kit 214*a* and consists of two users assigned extensions DK 214-1 and DK 214-2, respectively. A second group (Group B) of Customer 1 users is supported by extension device kit 214*b* and consists of two users assigned extensions DK 214-3 and DK 214-4, respectively. It will be readily appreciated that the number of groups may be enlarged, as may the number of extensions associated with each group, the depicted arrangement being constrained to a relatively small number in the interest of clarity and ease of illustration.

Note that the two extension device kits 214*a*, 214*b* are not identical. Extension device kit 214*a* is configured such that its supported extensions receive calls into a follow me device as follow me device 232*b* which, in turn, will first try a SIP handset device 240*a* (which will ring employee A's desk phone), and if no answer, then call a PSTN device as device 238*c* which routes back to the customer 1 PBX 204*a* to make an outbound call to a cell phone. If there is no answer from the cell phone within a certain amount of time, then the follow me 232*b* sends the call to the answering machine 236*b*.

Extension device kit 214*b* is configured slightly differently. Calls assigned to an extension supported by extension device kit 214*b* will receive calls into its follow me device as device 232*c* which in turn will first try a SIP handset device as device 204*b* (which will ring employee B's desk phone), and if no answer, then call a PSTN device 238 *d* which routes back to the customer 1 PBX 204 *a* to make an outbound call to employee B's home phone. If there is no answer from the home phone, then the follow me device 232*c* will send the call to the next PSTN device 238*e* (which forwards to employee B's mobile phone within a certain amount of time). Still if there is no answer, then the follow me device 232*c* sends the call to the answering machine device 236*c*. This example shows how the same device kit type (extension in this case) can be configured differently with different numbers of devices within to serve slightly different functionality. In other embodiments, If there is no answer from the home phone, PSTN device 238*e* may forward to employee A's follow me 232*b* through PBX 204*a* within a certain amount of time.

The call queue device kit 218 is made of two devices, call queue device 244 and call queue music on hold 224*b*. When a call comes into the call queue device 244, it determines if any agents assigned to the queue are logged in, and if so are they available. If so, it sends the call to the first available agent based on the chosen algorithm, if not it connects the caller to the call queue music on hold device 224 *b*. It then keeps checking for available agents, and as soon as one becomes available, it moves the call to the available extension through the PBX 204*a*.

Note that at a given moment in time, any number of calls can be going on through configuration graph 200, and indeed through any one device. For each call going through a device, a separate copy of the device executes. Generally speaking, all upstream (parent) devices stay running while the call is being processed by downstream devices, until the call ends. In most cases, upstream devices do not do anything active after passing the call, but in some cases they might do some tasks such as in the call queue device 244 case where it continues to look for available agents.

Figure 3:
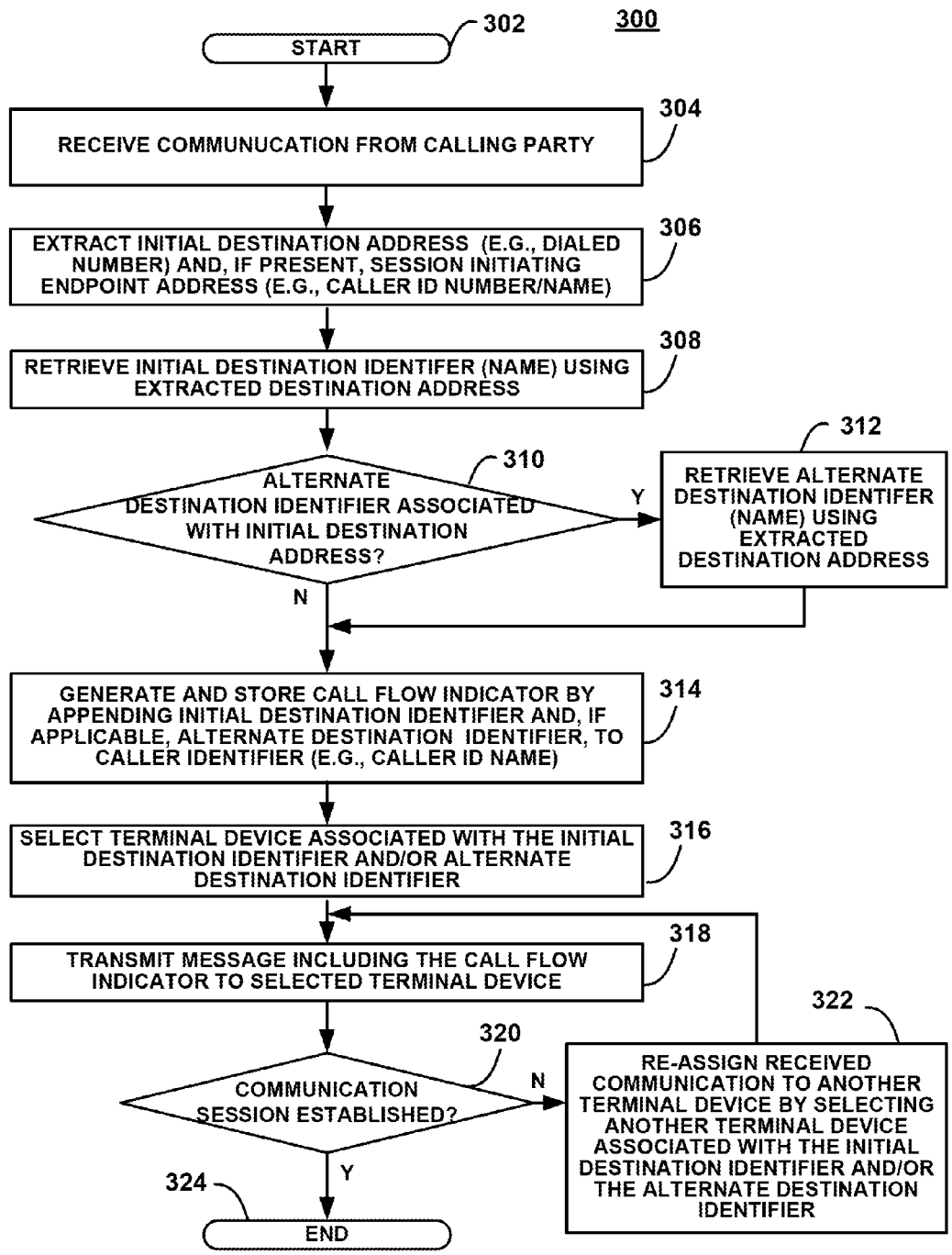
FIG. 3 is a flow diagram illustrating a method for providing call flow information to a device associated with one or more destination identifiers and/or groups in accordance with exemplary embodiments of the present invention.

FIG. 3 is a flow diagram illustrating a method 300 for providing call flow information to a device associated with one or more destination identifiers and/or groups in accordance with exemplary embodiments of the present invention. The method 300 is entered at 302 and proceeds to 304 where a communication from a called party is received. The method 300 proceeds to 306.

At 306, an initial destination address is extracted as, for example, the number dialed by the session initiator or caller. If Caller ID (CLAS) services are supported by the local exchange carrier or other provider, the session initiating endpoint address and/or name of the calling party is also extracted. The method 300 proceeds to 308.

At 308, an initial destination identifier is retrieved (e.g. the name of a group, department, user or advertising campaign with which the initial destination address is associated). In some cases, the initial destination identifier is for tracking purposes and is one of a plurality of destination identifiers assigned to the same group, department, or user. If so, an alternate destination identifier may be needed for purposes of selecting the correct terminal device or group of terminal devices to receive the call. At 310, a determination is made as to whether an alternate destination identifier is associated with the call. If so, the method 300 proceeds to 312 and the alternate destination address is retrieved using the extracted, initial destination address. If not, or subsequent to retrieving the alternate destination address at 312, the method 300 proceeds to 314.

At 314, a call flow indicator which includes at least the initial destination identifier is generated and stored. If the name of the caller is also available, then in some embodiments the call flow indicator comprises both the initial destination identifier and identifying information relating to the caller. In an embodiment, the call flow indicator comprises an alphanumeric representation of the caller's name, to which is appended an alphanumeric representation of the initial destination. In still other embodiments, such as where an alternate destination is needed to route the call, the alternate destination may also be appended. By way of illustrative example, if a call is forwarded to a user's terminal device via the PSTN after being answered by a system such as system 10 of FIG. 1, then the system would provide both the initial destination address and alphanumeric indicia of the alternate address. In this way, a user of a mobile or home phone configured to receive both personal calls and business-related calls can readily discern the call flow for an arriving call and take appropriate action.

At 316, the method 300 selects a terminal device associated with the initial destination identifier and/or the alternate destination identifier and, at 318, transmits a message bearing the call flow indicator to the selected terminal device. If, at 320, it is determined that a communication session has not been established because, for example, the call has gone unanswered for a predetermined number of rings, then the method 300 proceeds to 322, and the received communication is reassigned to a different terminal device associated with the initial destination identifier and/or the alternate destination identifier. In some embodiments, the method 300 selects a different terminal device associated with the same employee/user (i.e., a home phone rather than a cell phone).

In alternate embodiments, the method 300 selects a terminal device associated with a different employee/user that belongs to the same department or organization.

If at 320 method 300 determines that a communication session (i.e., a connection) has been established between the session initiating endpoint of the caller and the terminal device to which the call was assigned, then the method 300 terminates at 324.

Figure 4:
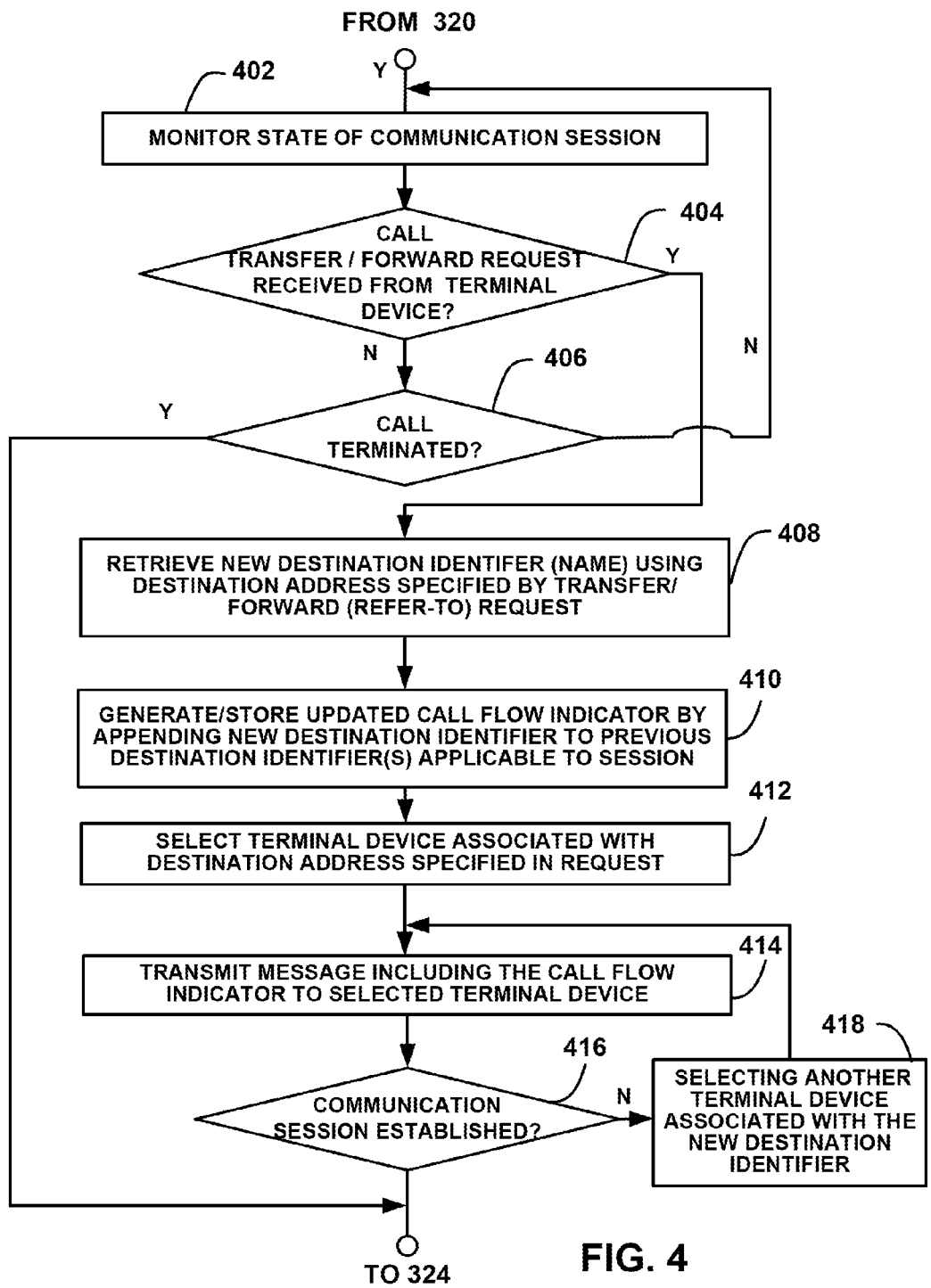
FIG. 4 is a flow diagram illustrating a method 400 for providing call flow information to a device associated with one or more destination identifiers and/or groups, as, for example, a sub-process of the method of FIG. 3, after a forwarding or transfer operation, in accordance with exemplary embodiments of the present invention.

FIG. 4 is a flow diagram illustrating a method 400 for providing call flow information to a device associated with one or more destination identifiers and/or groups, as, for example, a sub-process of the method of FIG. 3, after a forwarding or transfer operation, in accordance with exemplary embodiments of the present invention. The method 400 is entered at 402 following, for example, a determination at 320 of method 300 (FIG. 3) that a communication session/connection has been established between a caller and a parent device. At step 402, the state of the established communication session is monitored for an event such, for example, as a call termination, forwarding or multi-party conferencing invite event.

From 402, method 400 proceeds to 404, where it is determined whether a call forward/transfer request has been received from the parent device. If not, the method 400 proceeds to 406 where it is determined whether the call has been terminated by either call participant. If the call has been terminated, method 400 terminates and method 300 resumes at 324 (FIG. 3) where method 300 also terminates. If, at 406, it is determined that the call has not been terminated, the method 400 returns to 402 and continues monitoring for events.

If, at 404, it is determined that a call forward/transfer request has been received from the parent device, the method 400 proceeds to 408 where a new destination identifier is retrieved using, for example, the destination address specified by the transfer/forward request (e.g., a SIP REFER-TO request). The method proceeds to 410.

At 410, an updated call flow indicator is generated/stored. In an embodiment, the updated call flow indicator is generated by appending a new destination identifier to the destination identifier used in the preceding leg of the communication session (e.g., the initial destination identifier). The method proceeds to 412 and a terminal device associated with the destination address specified in the forwarding/transfer request is selected. The method 400 proceeds to 414 where a message including the call flow indicator is transmitted to the selected terminal device. It should be noted that the selection at 412 may be specified by the user as part of the forwarding/transfer operation and thus may precede the generation of the call flow indicator. If, at 414, it is determined that the transfer operation was successful and a new connection leg of the communication session was established, the method 400 terminates and operation is returned to method 300 via 324 (FIG. 3) where method 300 also terminates. If, however, it is determined at 414 that the transfer operation was not successful and was unsupervised, the method 400 proceeds to 418 where another terminal device associated with the new destination identifier (e.g., another employee in the same department of the same enterprise and having the same duties) is selected, and the method 400 returns to 414.

Figure 5:
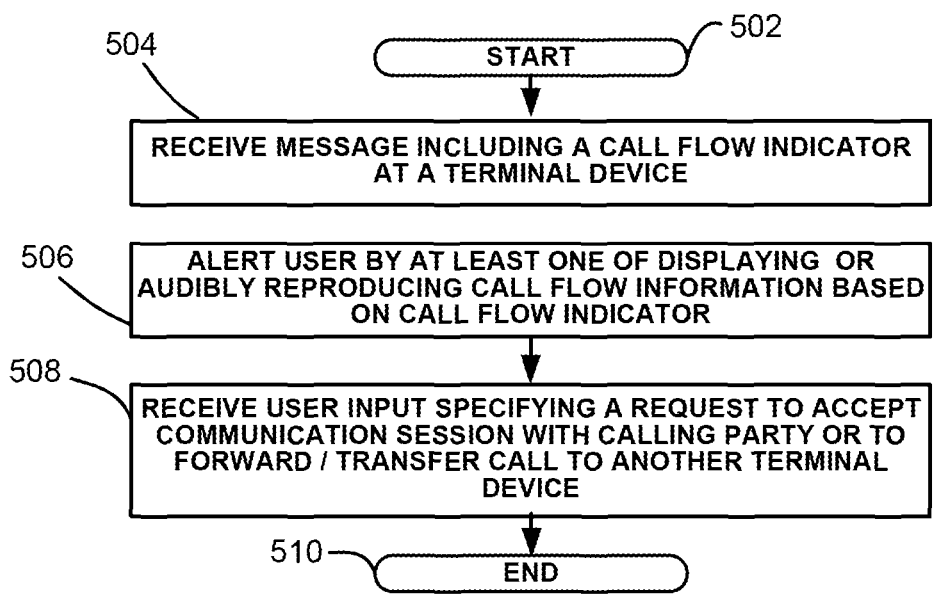
FIG. 5 is a flow diagram illustrating a method for providing call flow information to a user of a device in accordance with exemplary embodiments of the present invention.

FIG. 5 is a flow diagram illustrating a method 500 for providing call flow information to a user of a device in accordance with exemplary embodiments of the present invention. The method 500 is entered at 502 and proceeds to 504. At 504, a message including a call flow indicator is received at a terminal device such as, for example, a VoIP, PSTN or cellular telephone or softphone client executing, for example, on a notebook computer, tablet computer, smartphone or desktop computer.

The method 500 proceeds to 506, where a user of the receiving terminal device is alerted to the existence of an incoming call. In an embodiment, the alert is at least one of a visual or audible alert and contains one or more destination identifiers. In some embodiments, the destination identifier includes at least one of an indicator representative of an organization function, department, advertising campaign, or endpoint device or context type (e.g., "Work_to_Home") ("Work_to_Mobile"). In some embodiments, multiple addresses are concatenated to form a call flow indicator that is updated by appending a new destination identifier each time a new leg is added to a communication session.

Other methods for generating and/or providing the call flow notification to a target recipient of an incoming communication besides the display of a concatenated identifier via the display of a communication terminal are possible and are intended to be within the scope of the claimed invention. For example, a pop-up in a graphical user interface displayed to the display of the receiving terminal device or to the display of an adjunct device linked to the receiving terminal or source of the notification via a local area network, peer-to-peer network, or direct wireless link (using, for example, a Bluetooth or other suitable connection. Alternatively, or in addition, a push notification or an SMS may be provided to alert a user to the call flow associated within an incoming communication.

In still other embodiments, an audible alert may be played when the terminal device is first taken "off-hook" by the intended recipient. Audibly reproduced before an active communication session is set up between the calling party and user of the receiving terminal device, such an audible notification may include any of a recorded voice announcement or an audible output from a text-to-speech engine delivered via a conventional PSTN or cellular link.

The method 500 proceeds to 508, where user input—constituting a request responsive to an incoming alert—is received. The response may be to accept, refuse or forward, unanswered, an incoming communication. The method terminates at 510.

FIG. 6A is a tabular representation of stored associations between respective destination identifiers (e.g., external and/or internal destination addresses), one or more defined groups and/or departments, and respective tags used to generate call flow indicators in accordance with one or more embodiments of the present invention. The table comprises a list of external destination addresses ("External ID") and internal destination addresses ("Internal ID"), either of which may be initial destination addresses as described herein. It should be further emphasized that although phone numbers and extensions are illustrated and discussed herein, it is deemed to be within the spirit and scope of the present disclosure to use, in addition or alternatively, SIP and other suitable addressing protocols to accommodate the tracking of inbound communications, selection of destination endpoints, and generation of call flow indicators which are described herein.

Associated with each set of external (e.g., telephone numbers) and internal destination addresses (e.g. internal extensions) are destination identifiers. In the table depicted in FIG. 6A, the destination identifiers are in the form of group, department, or tracking identifiers (e.g., ad campaign identifiers). Each of these group, department or tracking identifiers has an associated tag which, in some embodiments, is used to construct a call flow indicator.

FIG. 6B is a tabular representation of communication session records, relating each communication session to a specific session identifier, session initiator (e.g., caller), internal destination identifier, and pre-defined tag, in accordance with one or more embodiments of the present invention. As seen in FIG. 6A, a session ID is created and stored each time a communication session is initiated. A session ID may have a single leg, as session ID#020115002 or it may have multiple legs, as each of session ID#020115001, 020115003 and 020115004. Also included in the table is the number of legs ("hops") for each communication session, the internal destination ID of the terminal device assigned to each leg, and the applicable tag corresponding to each leg.

Figure 7A:
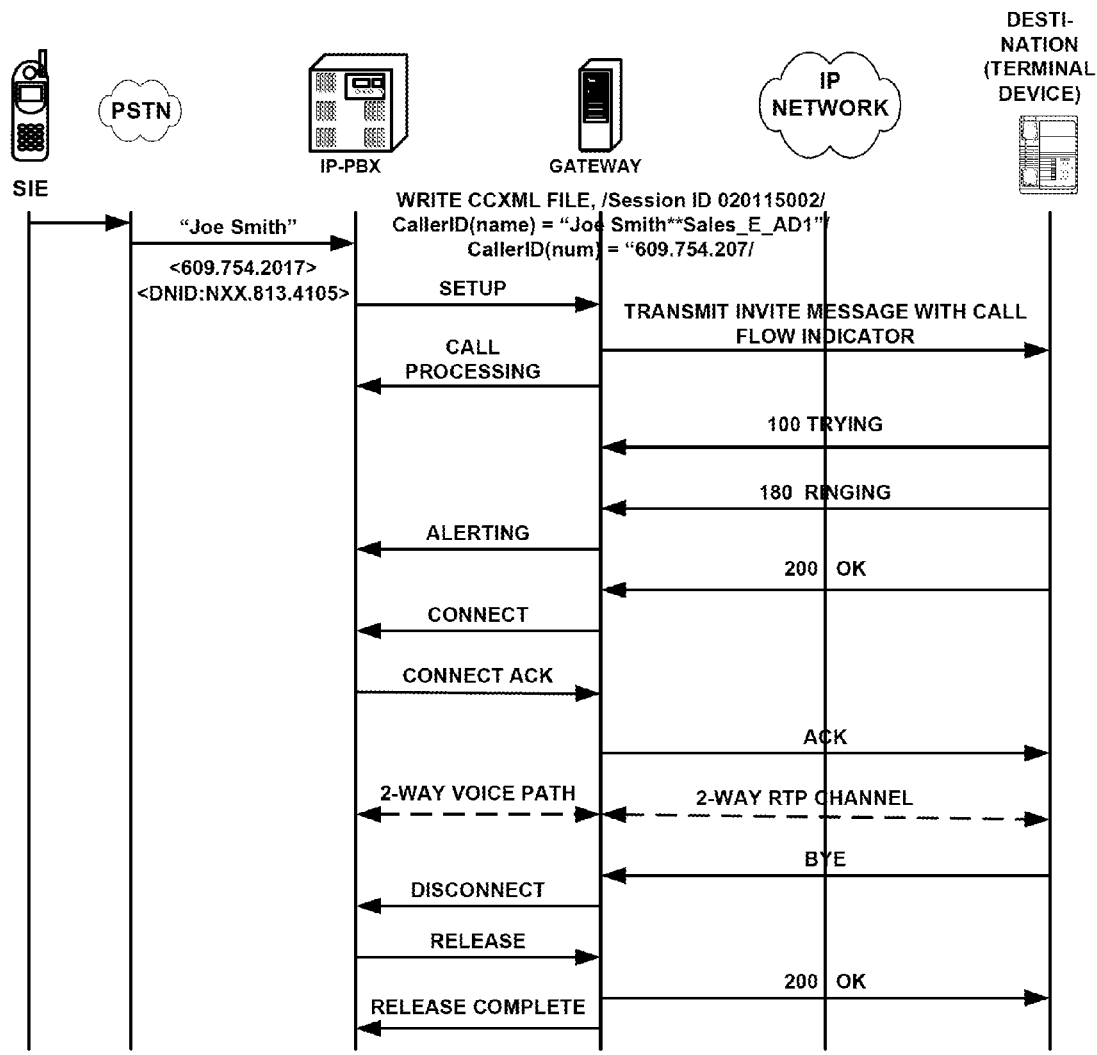
FIG. 7A is an exemplary call flow diagram depicting the exchange of messages to facilitate call flow indication to one or more terminal devices participating in a communication session, in accordance with one or more embodiments of the present invention.

FIG. 7A is a message flow diagram depicting the development, flow and processing of messages between a session initiating endpoint (e.g., a calling party using a PSTN to place a call to an enterprise) and a destination terminal device (i.e. an employee of the enterprise). In embodiments exemplified by FIG. 7A, caller identification services are supported by the applicable CLEC and the identity ("Joe Smith"), calling number ("609 754-2017") and dialed number ("NXX 813-4105") are passed by the PSTN to an IP-PBX. From the IP-PBX, a communication session set up request is sent to a gateway server. The call setup initiated between the PBX and the Gateway includes the standard transactions that take place as the user of the SIE attempts to call the user of a destination terminal device.

In an embodiment, the gateway server writes a CCXML file for Session ID#020115002 (FIG. 6B). A separate record is created for each leg of the communications session, relating the identity (name) and number of the caller (if available), the dialed number, and a newly generated call flow indicator which comprises, in some embodiments embodiment, both the caller ID name and the one or more alphanumeric tag(s) (e.g., "Sales_E_Ad1") assigned to the dialed number NXX 813-4105. In addition, or alternatively, each of the tag(s) forming a call flow indicator may be stored in the record as one or more file address entries, where each file address entry corresponds to a file formatted according to an audible format (e.g. a WAV or MP3 file format) and serving as an audibly reproducible representation of the tag(s). Such a file may be generated in advance by the TTS/ASR engine 75 (FIG. 1. Alternatively, the audible representation may be dynamically generated by TTS/ASR 75 "on the fly" each time the need to a particular call flow indicator arises. It suffices to say that embodiments consistent with the present disclosure enable presentation, to an intended call recipient using a provisioned communication terminal, of either or both of a visually displayed call flow indicator and/or an audibly reproduced call flow indicator. Audible call flow indicators may be especially advantageous, for example, where the tags comprising a call flow indicator would require too many characters to fit simultaneously on a terminal's display.

In some embodiments, one or both of the visual and audible call flow indicator(s) is/are displayed and/or audibly presented after the "invitee" communication terminal goes off-hook (e.g., the terminal user picks up a handset or presses a speaker phone button) but before a communication session is established with the session originating party (e.g., a caller). Accordingly, if the terminal user elects to accept an invitation and join a communication session after seeing and/or hearing the call flow indicator, the system 100 connects the parties. If not, the call receives further treatment according to an established call flow (i.e. to voice mail, to a next available agent or hunt group, or the like).

In an embodiment, the gateway responds to a call set up operation and creation of a CCXML file by mapping a SIP URL phone number to a dial peer, including the IP address of the port number of SIP enabled entity to contact. The gateway sends a SIP INVITE request message and call flow indicator to the address it receives as the dial peer which, in this scenario, is the next available terminal device entrusted to handle calls specifying the initial destination address. The call flow indicator may optimally include one or more alternate (additional) destination identifiers (e.g. tags). The gateway server also sends a call processing message to the PBX The gateway then sends a call proceeding message to the PBC to acknowledge the call set up request. The destination terminal device sends a SIP 100 trying response to the gateway to indicate that the INVITE request has been received by the destination terminal device, and then sends a 180 RINGING response to indicate that the user is being alerted. The gateway, in turn sends an alert message to indicate that the gateway has received a 180 RINGING response from the destination terminal device. The SIE user hears a ringback tone that indicates the user of the destination terminal device is being alerted.

The destination terminal device then sends a SIP 200 OK response to the gateway. The 200 OK response notifies the gateway that the connection has been made. The gateway sends a Connect message to the PBX to notify the PBX that the connection has been made, and the PBX then acknowledges the connection via the CONNECT ACK message. The gateway then sends a SIP ACK to the destination terminal device, confirming that the gateway has received the 200 OK response. The call session is now active.

Figure 7B:
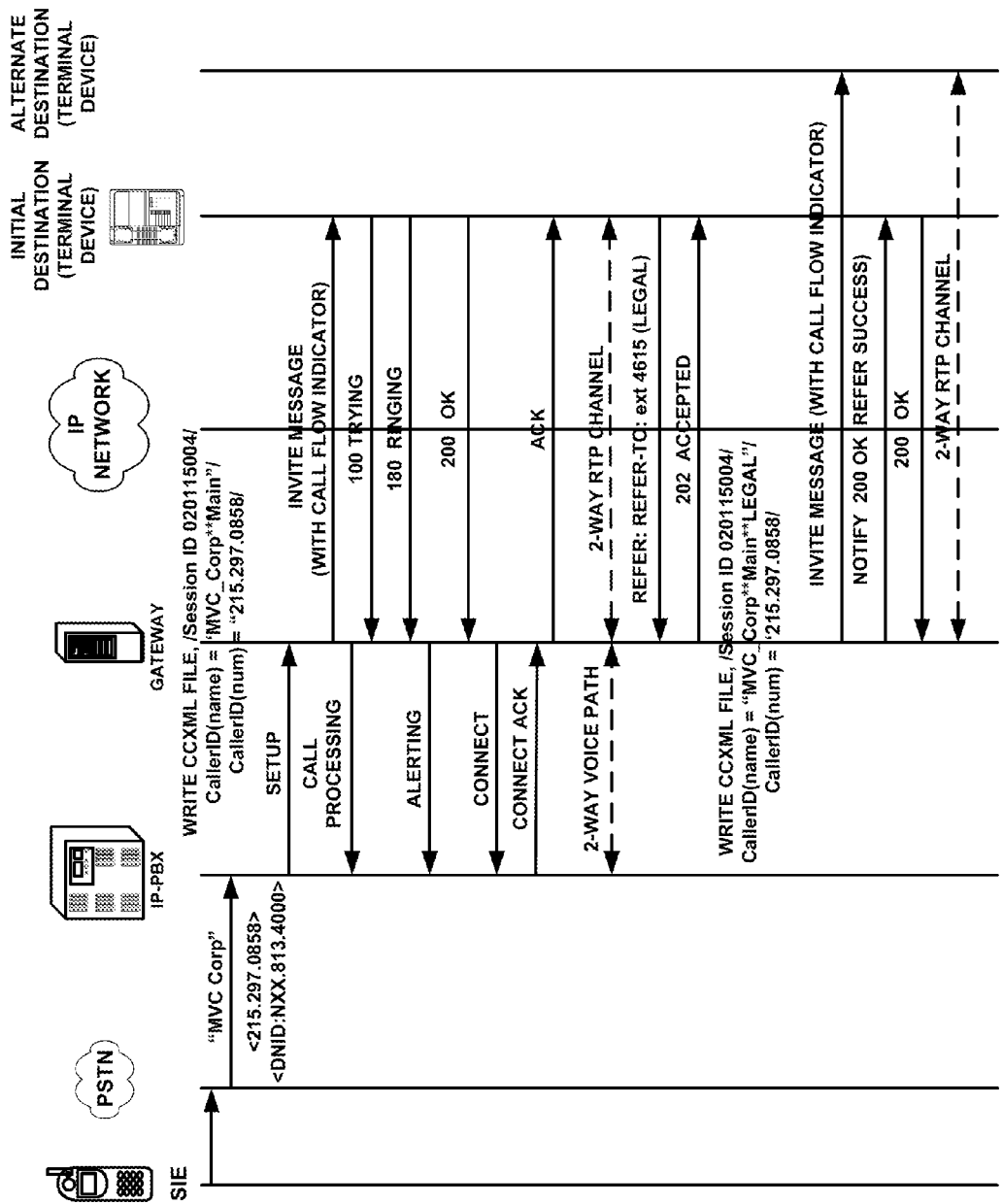
FIG. 7B is an exemplary call flow diagram depicting the exchange of messages to facilitate call flow indication to one or more transferee terminal devices participating in a communication session, in accordance with one or more embodiments of the present invention.

FIG. 7B is a message flow diagram depicting the development, flow and processing of messages between a session initiating endpoint (e.g., a calling party using a PSTN to place a call to an enterprise) and a first destination terminal device (e.g. an employee of the enterprise) followed by a second terminal device (e.g., a second employee of the enterprise). In embodiments exemplified by FIG. 7B, the process proceeds in the same manner as described in connection with FIG. 7A. In this case, the name of the caller is "MVC Corp" and the initial destination address is "Main".

In an embodiment, gateway server writes a CCXML file for Session ID#020115004 (FIG. 6B). A separate file is created for each of the two legs of the Session, relating MVC Corp and its caller ID number (215) 297-0858, to the dialed number NXX-813-4000, and a newly generated call flow indicator which comprises, in an embodiment, both the caller ID name and the tag ("MAIN") assigned to the dialed number NXX 813-4105. In the embodiment of FIG. 7B, the call is forwarded from the initial destination (answering) terminal device to an alternate destination (transferee) terminal device. To this end, the answering terminal device sends SIP REFER-TO message to the gateway in order to set up the transfer. The REFER-TO request is accepted and gateway server writes a new CCXML file for Session ID#020115004 (FIG. 6B). An updated call flow indicator is generated and transmitted to the alternate destination (terminal device), the updated call indicator having appended to the caller ID name both the initial destination identifier ("MAIN") and the transferee destination identifier ("LEGAL").

Figure 8A:
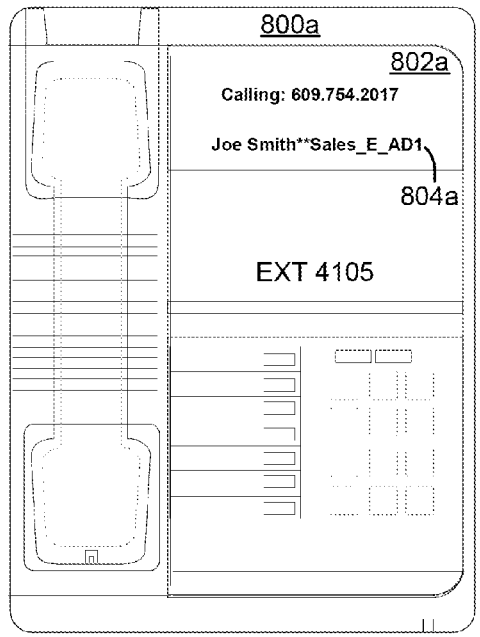
FIG. 8A depicts the operation of a terminal device to visually present, via a display, call flow information associated with a communication session, in accordance with one or more embodiments of the present invention.

FIG. 8A depicts a communication terminal 800a configured to visually present a call flow indicator 804a to a user, the indicator comprising at least an initial destination identifier (e.g., the word, phrase or name assigned to the initial destination address) according to one or more embodiments of the invention. In the illustrative example of FIG. 8A, the name and number of the calling party are available and the call flow indicator is obtained by appending (or pre-pending) the initial destination address ("Sales_E_AD1") to the calling party name ("Joe Smith"). In an embodiment, several asterisks are inserted to delimit the respective components of the call flow indicator 804a. The call flow indicator, as well as the calling party's telephone number, is rendered to a display 802a.

Figure 8B:
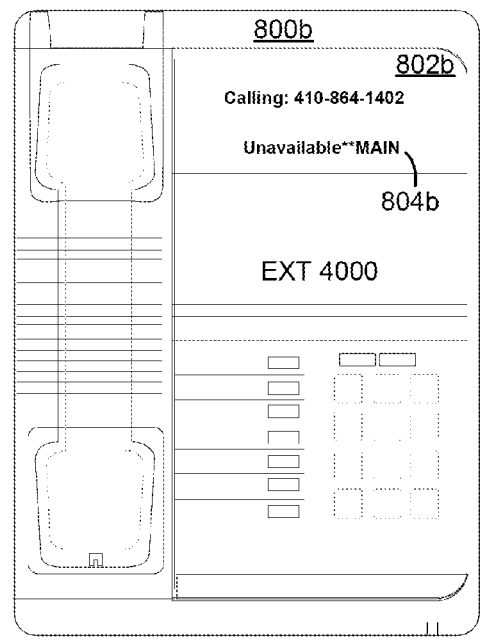
FIGS. 8B to 8D depict the operation of three different terminal devices to visually present, via a respective display, call flow information associated with the same communication session prior to and subsequent to respective transfer/forward operations, in accordance with one or more embodiments of the present invention.

FIG. 8B depicts a communication terminal 800b configured to visually present a call flow indicator 804b to a user, the indicator comprising at least an initial destination identifier according to one or more embodiments of the invention. In the illustrative example of FIG. 8B, the number but not the name of the calling party is available and so an initial call flow indicator is obtained by appending (or pre-pending) the initial destination address ("MAIN") to a default calling party unavailable identifier ("Unavailable"). Here again, asterisks are inserted to delimit the respective components of the call flow indicator 804b. The call flow indicator 804b and calling party's telephone number are rendered to display 802b of phone 800b.

Figure 8C:
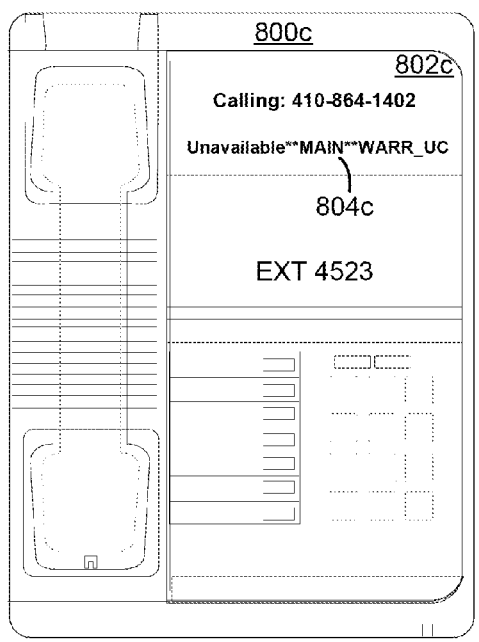

FIG. 8C depicts a communication terminal 800c configured to visually present a call flow indicator 804c to a user. In this case, the call flow indicator presented at communication terminal 800c includes both the initial destination identifier and an alternate destination identifier (i.e., word, phrase, or name associated with the same or a second terminal device) according to one or more embodiments of the invention. In the illustrative example of FIG. 8C, the call was forwarded by the employee who answered the call arriving at extension 4000 (i.e., communication terminal 800b) to an employee assigned to extension 4523 and working in the Unified Communication Products Warranty department. In this case, and as best seen by reference to FIG. 6A, the administrator has assigned the tag "WARR_UC" to a block of extensions which includes extension 4523. As such, when terminal 800b is operated to transfer the call to terminal 800c, an updated call flow indicator is generated comprising both the initial destination identifier ("MAIN" and the alternate destination identifier ("WARR_UC"). The resulting indicator 804c is displayed on display 802c of terminal 800c as an alert to the user of extension 4523.

Figure 8D:
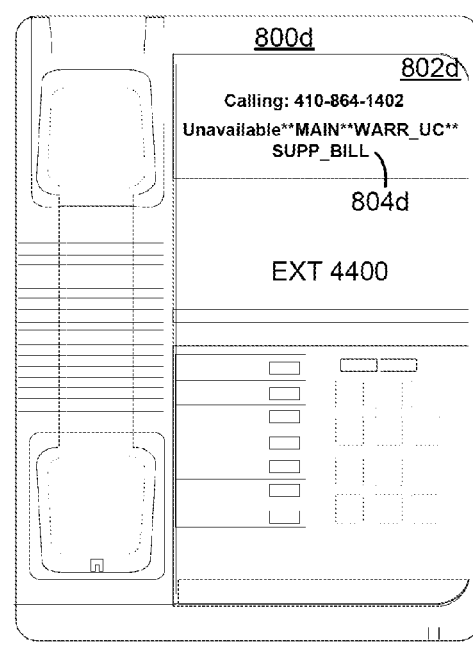

FIG. 8D depicts a communication terminal 800d configured to visually present a call flow indicator 804d to a user assigned to extension 4400. In this case, the call flow indicator presented at communication terminal 800d includes both the initial destination identifier "MAIN", a first alternate destination identifier "WARR_UC" and a second alternate destination identifier "SUPP_BILL". In the illustrative example of FIG. 8D, the call was forwarded by the employee who answered the call arriving at extension 4523 (i.e., communication terminal 800c) to the employee assigned to extension 4400 and working in the Billing Support department. Returning again to FIG. 6A, it will be seen that the administrator has assigned the tag "SUPP_BILL" to a block of extensions which includes extension 4400. As such, when terminal 800c is operated to transfer the call to terminal 800d, the updated call flow indicator "MAINWARR_UCSUPP_BILL" is generated.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java®, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
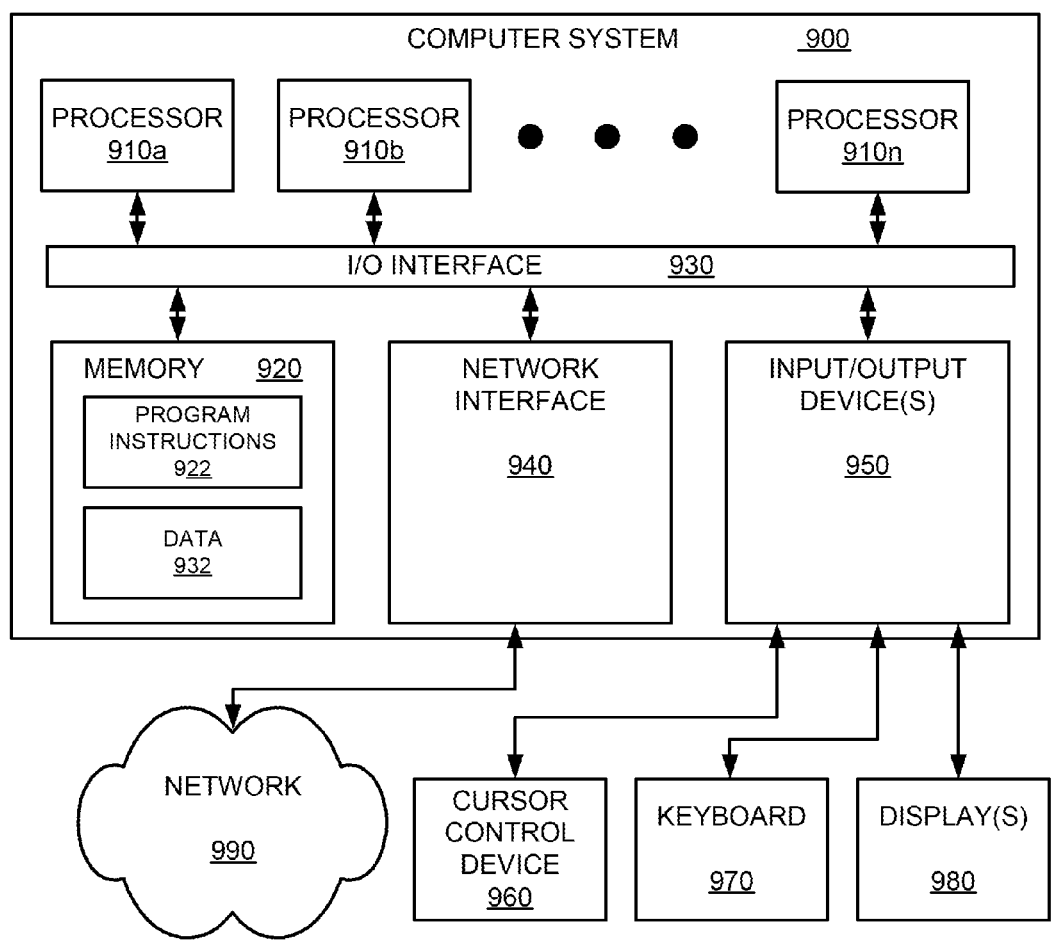
FIG. 9 is a detailed block diagram of a computer system, according to one or more embodiments.

FIG. 9 is a detailed block diagram of a computer system, according to one or more embodiments, that can be utilized in various embodiments of the present invention to implement the server(s), gateway(s), telephony endpoints, and/or the display devices, according to one or more embodiments.

Various embodiments of method and apparatus for organizing, enhancing and presenting message content and associated notifications, as described herein, may be executed on one or more computer systems, which may interact with various other devices. One such computer system is computer system 900 illustrated by FIG. 9, which may in various embodiments implement any of the elements or functionality illustrated in FIGS. 1-8D. In various embodiments, computer system 900 may be configured to implement methods described above. The computer system 900 may be used to implement any other system, device, element, functionality or method of the above-described embodiments. In the illustrated embodiments, computer system 900 may be configured to implement method 300 (FIG. 3), method 400 (FIG. 4), method 500 (FIG. 5), method 700 (FIG. 7A) and/or method 710 (FIG. 7B) as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, and one or more input/output devices 750, such as cursor control device 960, keyboard 970, and display(s) 980. In various embodiments, any of the components may be utilized by the system to receive user input described above. In various embodiments, a user interface may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, computer system 900 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more display devices (not shown), or one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more communication terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the methods illustrated by the flowcharts of FIGS. 2-6. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for providing call flow information to terminal device users, comprising:
   receiving a communication from a calling party;
   generating a first call flow indicator, the call flow indicator including an identifier of an initial destination for the received communication, wherein the initial destination is a number or network address associated with at least one of
      a department associated with a plurality of possible recipients,
      a prior recipient of the received communication with whom a communication session has already been established, or
      an initially intended recipient of the received communication;
   transmitting an identifier of the calling party and the generated first call flow indicator to a recipient group, wherein the recipient group comprises at least one of a terminal device associated with the initial destination, a terminal device associated with an alternate destination, or a terminal device associated with a subsequent destination; and
   in response to a determination of a subsequent destination for the received communication, updating the first call flow indicator to include a respective identifier of the subsequent destination for the received communication.

2. The method of claim 1, wherein the identifier of the calling party is transmitted to the recipient group over a first channel and wherein the generated first call flow indicator is transmitted to the recipient group over a second channel separate from the first channel.

3. The method of claim 2, wherein the identifier of the calling party is formatted for processing, by each terminal device of the recipient group, to display text identifying the caller, and
   wherein the generated first call flow indicator is formatted for processing, by at least one of each terminal device of the recipient group or a device associated with a user of the recipient group, as an audible indication of the initial destination for the received communication.

4. The method of claim 1, wherein the recipient group comprises a terminal device associated with an alternate destination, the method further comprising:
   determining that the communication has been one of forwarded from the initial destination to the alternate destination or re-assigned to the alternate destination;
   generating, in a second generating step, a second call flow indicator, the second call flow indicator including the identifier of the initial destination and an identifier of the alternate destination; and
   transmitting, to a terminal device associated with the alternate destination, the generated second call flow indicator and the identifier of the calling party.

5. The method of claim 4, wherein the identifier of the initial destination and the identifier of the alternate destination are at least one of an alphanumeric identifier or an audible identifier.

6. The method of claim 4, further comprising assigning a corresponding group of one or more terminal devices to each of the initial and alternate destinations.

7. The method of claim 6, wherein at least one of the assigned groups includes a plurality of terminal devices.

8. The method of claim 6, further comprising storing, in a database, a record associating the identifier of the initial destination with at least one of a date, time, duration or calling party identifier of the communication.

9. The method of claim 1, wherein the generated first call flow indicator is transmitted as a Session Initiation Protocol (SIP) message.

10. The method of claim 1, further including extracting the identifier of the initial destination from the received communication.

11. A method for providing call flow information, comprising:
   receiving a communication from a calling party, the communication specifying an initial destination;
   at least one of
      assigning the received communication to a terminal device associated with the initial destination and with an alternate destination;
      forwarding the received communication from a terminal device associated with the initial destination to a terminal device associated with the alternate destination, or
      re-assigning the received communication to a terminal device associated with the alternate destination rather than with the initial destination responsive to a call set up failure;
   generating a call flow indicator, the call flow indicator including an identifier of the initial destination and an identifier of the alternate destination; and
   transmitting, to the terminal device associated with the alternate destination, a message including the generated call flow indicator.

12. The method of claim 11, further comprising assigning, for use during the generating, a corresponding group of one or more terminal devices to each of the initial and alternate destinations.

13. The method of claim 12, wherein at least one of the groups includes a plurality of terminal devices.

14. The method of claim 11, further including extracting the identifier of the initial destination from the received communication.

15. The method of claim 14, further comprising storing, in a database, a record associating the identifier of the initial destination with at least one of a date, time or duration of the communication.

16. A method for providing call flow information to a user of a terminal device, comprising:
   receiving, at the terminal device, a message including a call flow indicator, wherein the call flow indicator includes an identification of a destination for a communication received from a call originator; and
   alerting a user to the identification of the destination by audibly reproducing, at the terminal device, a name of the destination and a name of the call originator, wherein the receiving terminal device is one of a plurality of terminal devices assigned to the destination.

17. The method of claim 16, wherein alerting the user includes displaying a graphical alert on the receiving terminal device, the graphical alert comprising a name of the destination.

18. The method of claim 17, wherein the name of the destination displayed in the graphical alert is appended to a displayed name of the call originator.

19. Apparatus for providing call flow information to a terminal device, comprising:
   a) at least one processor;
   b) at least one input device; and
   c) at least one storage device storing processor-executable instructions which, when executed by the at least one processor, performs a method including:
   receiving a communication from a calling party, the communication specifying an initial destination;
   at least one of:
      assigning the received communication to a terminal device associated with the initial destination and with an alternate destination;
      forwarding the received communication from a terminal device associated with the initial destination to a terminal device associated with the alternate destination, or
      re-assigning the received communication to a terminal device associated with the alternate destination rather than with the initial destination responsive to a call set up failure;
   generating a call flow indicator, the call flow indicator including an identifier of the initial destination and an identifier of the alternate destination; and
   transmitting, to the terminal device associated with the alternate destination, a message including the generated call flow indicator.

20. The apparatus of claim 19, wherein the at least one storage device further stores instructions executable by the at least one processor to assign, for use during the generating, a corresponding group of one or more terminal devices to each of the initial and alternate destinations.

21. The apparatus of claim 19, wherein the at least one storage device further stores instructions executable by the at least one processor to extract the identifier of the initial destination from the received communication.

22. The apparatus of claim 21, wherein the at least one storage device further stores instructions executable by the at least one processor to store, in a database, a record associating the identifier of the initial destination with at least one of a date, time or duration of the communication.

23. A method for providing call flow information, comprising:
   receiving a communication from a calling party;
   generating a call flow indicator, the call flow indicator including an identifier of an initial destination for the received communication, wherein the generating includes formatting the call flow indicator for processing, by at least one of the terminal device or a device associated with user of a terminal device, as at least one of a visible or an audible indication of the initial destination for the received communication;
   transmitting, to at least one of a terminal device associated with the initial destination or a terminal device associated with a subsequent destination, a message including the generated call flow indictor; and
   in response to a determination of a subsequent destination for the received communication, updating the first call flow indicator to include a respective identifier of the subsequent destination for the received communication.

24. The method of claim 23, wherein the transmitting includes transmitting an identifier of the calling party over a first channel and transmitting the generated call flow indicator over a second channel separate from the first channel.

25. The method of claim 23, wherein the generated call flow indicator is transmitted as an SMS message and the identifier of the calling party is transmitted between ringing signals over a public service transmission network (PSTN).

* * * * *